(12) United States Patent
Granstam et al.

(10) Patent No.: US 7,069,018 B1
(45) Date of Patent: Jun. 27, 2006

(54) MOBILE TERMINAL

(75) Inventors: Bo Granstam, Kållered (SE); Mattias Leijon, Göteborg (SE); Christian Vejgaard Nielsen, Göteborg (SE)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 411 days.

(21) Appl. No.: 10/129,568

(22) PCT Filed: Nov. 10, 2000

(86) PCT No.: PCT/SE00/02214

§ 371 (c)(1), (2), (4) Date: Jul. 16, 2002

(87) PCT Pub. No.: WO01/35687

PCT Pub. Date: May 17, 2001

(30) Foreign Application Priority Data

Nov. 12, 1999 (SE) .................................. 9904103

(51) Int. Cl.
*H04Q 7/20* (2006.01)

(52) U.S. Cl. ................. 455/456.1; 455/414.1; 455/456.3

(58) Field of Classification Search ............. 455/414.2, 455/456.1, 456.3
See application file for complete search history.

(56) References Cited

U.S. PATENT DOCUMENTS

| | | | | |
|---|---|---|---|---|
| 5,247,700 A * | 9/1993 | Wohl et al. | ............... | 455/552.1 |
| 5,434,908 A | 7/1995 | Klein | .................. | 379/88 |
| 5,668,853 A * | 9/1997 | Florence et al. | ............ | 379/67.1 |
| 5,731,785 A * | 3/1998 | Lemelson et al. | ..... | 342/357.07 |
| 5,757,899 A | 5/1998 | Boulware et al. | ............ | 379/196 |
| 5,930,700 A | 7/1999 | Pepper et al. | ............... | 455/414 |
| 5,937,397 A * | 8/1999 | Callaghan | ..................... | 706/10 |
| 5,978,806 A | 11/1999 | Lund | ........................... | 707/10 |
| 6,085,098 A * | 7/2000 | Moon et al. | ................. | 455/457 |
| 6,263,209 B1 * | 7/2001 | Reed et al. | ............. | 455/456.3 |
| 6,266,612 B1 * | 7/2001 | Dussell et al. | ............. | 701/207 |
| 6,278,884 B1 * | 8/2001 | Kim | ........................ | 455/556.1 |
| 6,438,393 B1 * | 8/2002 | Suuronen | ................. | 455/575.1 |
| 6,665,534 B1 * | 12/2003 | Conklin et al. | ............ | 455/417 |
| 6,829,475 B1 * | 12/2004 | Lee et al. | .................... | 455/419 |

(Continued)

FOREIGN PATENT DOCUMENTS

DE 196 29535 A1 12/1997

(Continued)

OTHER PUBLICATIONS

International Search Report, International Application No. PCT/SE00/02214, Feb. 28, 2001, pp. 1-4.

*Primary Examiner*—George Eng
*Assistant Examiner*—Julie E. Stein

(57) ABSTRACT

The invention concerns a mobile terminal (MT) adapted to interact with at least one application such as an automatic answering application and/or a control application, comprising interact browser facilities or remote control facilities, the respective applications being adapted to enter at least two states, whereby the mobile communication terminal is adapted to sense the status of a user wearing or being in the vicinity of the mobile communication terminal. The status of the user being derived from input signals, such as sounds (MIC) surrounding the mobile communication terminal, movements (ACC) of the terminal, light (LTS) surrounding the terminal, the position (PSS) of the terminal or according to a predetermined schedule (SCH) relating to the user. The mobile communication terminal is adapted for controlling the modes of the at least one application in dependence on the users actual state, as determined from the input signals.

12 Claims, 6 Drawing Sheets

Control mode

| PSS | Browser/ctrl Mode |
|---|---|
| 20 Home | 10 Home |
| 21 Work | 11 Work |
| 22 Out | 12 Travel |

U.S. PATENT DOCUMENTS

2003/0123652 A1 * 7/2003 Firooz ............... 379/433.1

FOREIGN PATENT DOCUMENTS

| DE | 197 29645 A1 | 1/1999 |
| WO | WO 94/06106 A1 | 3/1994 |
| WO | WO 98/06210 A1 | 2/1998 |
| WO | WO 98/51056 A2 | 11/1998 |
| WO | WO 98/59506 A2 | 12/1998 |
| WO | WO 99/04582 A1 | 1/1999 |
| WO | WO 99/27742 A1 | 6/1999 |
| WO | WO 99/34564 A1 | 7/1999 |

* cited by examiner

Access Mode

|  | Access Mode | | | | | |
|---|---|---|---|---|---|---|
|  | 1 | 2 | 3 | 4 | 5 | 6 |
| Group ↓ | Sleep | Wrk meeting | Wrk active | Accept all | Home rest | Off |
| VIP(Fam) | A | B | Ring | Ring; C | Ring | C |
| Friends | A | C | A | Ring; C | Ring | C |
| Colleagues | A | B | Ring | Ring; C | D | D |
| Excluded | C | C | C | Ring; C | C | C |
| Rest | A | C | A | Ring; C | A | C |

Fig. 3

Default Schedule

|  | Mon - Fri | Weekend |
|---|---|---|
| 00 - 06 | d) Rest | d) Rest |
| 06 - 09 | b) Work Active* | d) Rest |
| 09 - 18 | b) Work Active* | a) Active |
| 18 - 21 | a) Active | a) Active |
| 21 - 24 | d) Rest | a) Active |

\* or c) Work meeting if specified in schedule

Fig. 4

Access mode

| Input signals | | | Access Mode |
|---|---|---|---|
| PSS | Light,sound,acc | Schedule | |
| 20 Home | z Calm | d) Rest | 1 "Sleep" |
| 20 Home | z Calm | a) Active | 5 "Home rest" |
| 20 Home | x Vivid | d) Rest | 5 "Home rest" |
| 20 Home | x Vivid | a) Active | 4 "Accept all" |
| 21 Work | - | c) Work meeting | 2 "Wrk meeting" |
| 21 Work | - | b) Work active | 3 "Wrk active" |
| 21 Work | - | a), d) | 3 "Wrk active" |
| 22 Out | - | a) - d) | 4 "Accept all" |

Fig. 5

Public state

| Access mode | Public state |
|---|---|
| 3, 4, 5 | 30 Ready for calls |
| 1, 2, 6 | 31 Not ready for calls |

Fig. 6

Control mode

| PSS | Browser/ctrl Mode |
|---|---|
| 20 Home | 10 Home |
| 21 Work | 11 Work |
| 22 Out | 12 Travel |

Fig. 7

| Sch | Browser/ctrl Mode |
|---|---|
| a) Active, d) Rest | 10 Home |
| b) Work active, c) Work meeting | 12 Work |

Fig. 8

MOBILE TERMINAL

FIELD OF THE INVENTION

The present invention relates to a mobile communication or telephony system and a communication terminal that enables a user to control the terminal according to the actual context in which the user appears or according to the users actual needs as well as informing callers about the users accessibility.

BACKGROUND OF THE INVENTION

Small miniaturised apparatuses, which fall under the term personal organisers typically comprise features such as telephone and address lists for contact persons, file storage and exchange with other devices, calendar, clock and calculator. These apparatuses are typically provided with a small keyboard and a small display or alternatively a touch sensitive display, on which data can be entered.

Personal organisers available on the marketplace today expand the possibilities of performing many different tasks on a small and mobile unit. These tasks may involve, communicating via e-mail, up-dating information over for instance the Internet, exchanging files with others or other systems, processing text files, playing audio files, presenting graphical files, etc.

Recently, the functionality, which typically has been found in so-called personal organisers, has been introduced into mobile phones. Another trend is that mobile phones are adapted to interact closely with personal organisers, whereby communication between these devices are accomplished by means of for instance an infra red or a radio interface.

It is known that mobile phones may make use of the Internet and its associated services through suitable modems. Personal organisers may also be equipped with radio interfaces, such as Mobitex™ interfaces, which provide for the issuance and reception of e-mails.

So-called WAP (Wireless Application Protocol) terminals recently put on the market enable terminals of limited physical size, memory and processing power, to retrieve and deliver information over the Internet through a so-called WAP browser.

As an example of a known personal organiser device reference is made to EP-A-0 853 287.

Prior art document EP-A-0 853 287 shows a PDA (personal digital assistant), comprising a miniaturised personal computer, a GSM interface and a GPS unit.

The above personal digital assistant is adapted to offer Internet access to the user. A certain user profile may be set up on the PDA whereby the location or travel route and accompanying information is automatically provided as part of an Internet search session. In this way, context related messages can be searched and provided by specific Internet servers.

User friendly operation is a very important aspect for personal mobile devices. One widely used way of solving the schism between advanced functionality and user friendly operation is to provide menu driven interfaces, which prompts possibilities in accordance with a predetermined task structure. This structure may be further refined according to the users own preferences.

However, menu driven systems are likely to appear tedious in connection with relatively small handheld devices, because of the limited space available for especially the graphical interface data enter means and because of the mobile aspects of their use.

Another way of facilitating the control of a handheld device is to implement voice recognition in the device.

The Ericsson™ mobile phone model T28, comprises a number representation function and a set of contact lists, whereby calls from persons belonging to predetermined lists may be filtered from gaining access to the user, i.e. obviating that the mobile phone rings and disturbs the user in a meeting situation or the like. Instead, the calling party receives a message from an answering application, that the user can be contacted later. Persons on another specific list may be allowed to call the user. The model also comprises voice recognition as a data entry means. This is an example of a context-related control of the mobile phone or personal organiser.

Prior art document U.S. Pat. No. 5,434,908 shows a message system coupled between a telephone exchange system and a computer or server, which includes calendar/schedule programs of individual subscribers. Predetermined messages are presented to a calling party, the messages corresponding to the called subscribers schedule settings.

Prior art document U.S. Pat. No. 5,930,700 shows a method and system that allows calls to be processed according to a called party's preferences. In a preferred embodiment, the system includes a database containing call origin priority information, call delivery preferences, and subscriber appointment schedule information such as call delivery address and times at which the caller expects to be at the call delivery address. Moreover, calls may be screened according to the subscriber's schedule and the priority attributed to the caller.

Prior art document WO 98/06210 shows a mobile telephone having a short range intra red interface being adapted to communicate with apparatuses near the mobile telephone. Both voice signals and remote control signals can be transmitted over the mobile telephone.

Prior art document WO 94/06106 shows a remote control system, which is adapted to control apparatuses in an environment in which the remote control is situated. The system according to the above document comprises three types of elements: A controller (handheld remote control device), a receiver (the device to be controlled) and a location information transceiver. According to the above document, a plurality of location information transceivers are located in the various facilities of a building and are transmitting location information to the controllers that may be situated in a given facility. The controller is informed about its location and the controller can, based on a location address map stored within the controller, automatically select the address codes of the receiver devices affecting that facility.

SUMMARY OF THE INVENTION

It is first object of the invention to provide a terminal, which in an easy way satisfies the habitual needs of a user in seeking information.

This object has been accomplished by the invention as defined by the subject matter defined by claim 1.

It is a further object of the invention to set forth a mobile terminal, which automatically selects appropriate control applications in dependency of the users needs.

This object has been accomplished by the invention as defined by the subject matter defined by claim 2.

It is another object of the present invention to sense the users needs and preferences, whereby the control is of an even more discrete and/or unconscious nature.

This object has been accomplished by the invention as defined by the subject matter defined by claim 3.

It is a further object of the invention to set forth a mobile terminal controlling an answering application in accordance with the users needs.

This object has been accomplished by the subject matter set forth in claim 4.

It is another object of the present invention to provide functionality in a mobile communication apparatus which may serve a user both in his/hers personal life as well as in his professional life, while still providing some sort of appropriate separation between the two spheres.

This object has been accomplished by the subject matter according to claim 5.

It is a further object to set forth a terminal that senses the user's state and interacts with a public database, such that other users can be informed about the users actual state.

This object has been accomplished by the subject matter set forth in claim 6.

It is a further object of the invention to set forth a mobile terminal, which is able to sense whether the user pertains to a calm or lively environment.

This object has been accomplished by the subject matter set forth in claims 8–10.

It is a further object of the invention to set forth a mobile terminal that can be worn unnoticed by the user.

This object has been accomplished by the subject matter set forth in claim 11.

Further advantages will appear from the following detailed description of the terminal.

BRIEF DESCRIPTION OF THE DRAWINGS

FIG. 3 is a preferred functional diagram of the operative access modes of the terminal, FIG. 4 is an exemplary diagram of the schedule of the terminal, FIG. 5 is a preferred functional diagram of the automatic selection of an appropriate access mode according to sensor inputs and schedule settings, FIG. 6 shows a diagram of public states according to the invention, FIG. 7 is a preferred functional diagram of the automatic selection of a control mode according to sensor inputs, FIG. 8 is an alternative to the functional diagram of FIG. 7.

DETAILED DESCRIPTION OF PREFERRED EMBODIMENTS OF THE INVENTION

Figure 1:
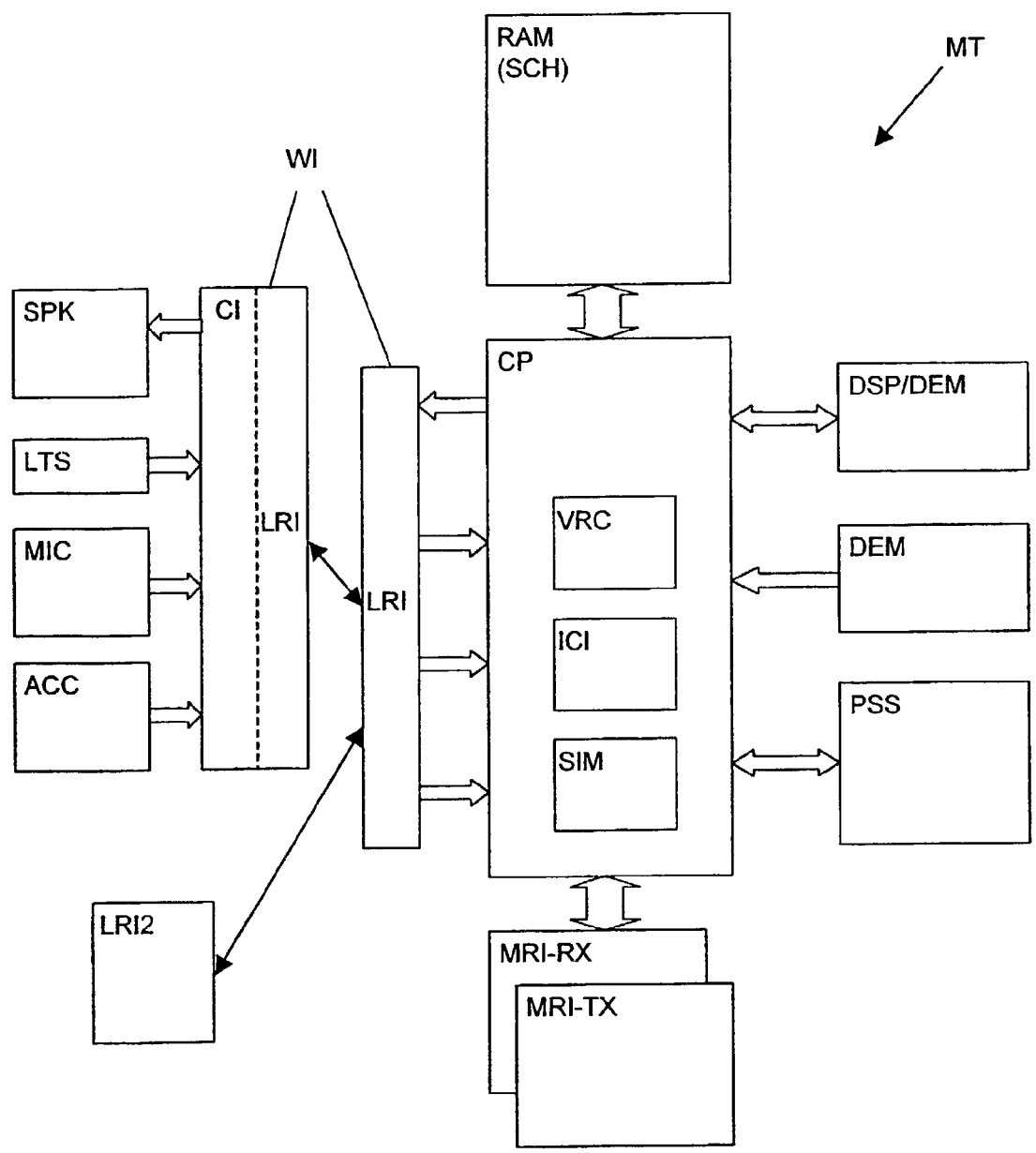
FIG. 1 shows a mobile terminal according to a preferred embodiment of the invention.

In FIG. 1, the terminal according to the invention has been shown.

The mobile terminal comprises a central processor, CP, comprising a microprocessor and memory, a mobile radio interface, MRI, for wirelessly transferring messages and sound signals to and from a base-station according to for instance the GSM (Globale Systeme Mondial) system, a random access memory, RAM, an input section comprising a microphone, MIC, and a data entering means, DEM, such as a keyboard, or a pressure sensitive display, DSP/DEM, or the like.

The mobile communication terminal also comprises standard elements such as, a subscriber identity module, SIM, preferably comprising a chip-card.

The mobile communication terminal furthermore comprises an output section, comprising means for generating sound output signals, SPK, and display means for generating picture output signals, DSP, and an internal conversion interface, ICI, for analogue to digital signal conversion and vice versa and other signalling processing.

Advantageously the terminal comprises a display, DSP, which also may form the data entering means, DSP/DEM.

The input section furthermore comprises a light sensor, LTS, an accelerometer, ACC, and a positional sub-unit, PSS.

As shown in FIG. 1, the mobile communication terminal is housed in separate first and second units communicating with one another over a wireless interface, WI, comprising a first local range interface and a second local range interface, LRI, the first and second local range interfaces being constituted for instance by a Bluetooth™ interface or by an infrared interface, which are available on the marketplace in modular form. The actual implementation of the local range interface in the terminal falls within the activity of which the skilled person in the art is fully capable.

The local range interface, LRI, may also communicate with other devices, for instance with an additional local range interface, LRI2, of another device (not shown).

The first housing comprises the microphone, MIC, the accelerometer, ACC, the light sensor, LTS, and the means for generating sound output signals, SPK, an additional conversion interface and processing means, CI, for performing conversion and signal processing tasks and the first local interface, LRI. As will be readily understood, the first unit can be rendered very small, since standard traducers of very small dimensions and low power consumption are generally available. A single transducer may form both the accelerometer and the microphone, whereby movements relating to the user are derived from low pass signal content, while sounds are derived from high pass signal content.

The second housing comprises the remaining elements, namely the positional sub-system, the memory, RAM, the display and data entering means, DSP/DEM, and the second local range interface, LRI.

The central processor, CP, also preferably comprises a voice recognition unit, VRC, adapted for recognising voice signals entered by the microphone, MIC.

According to a preferred embodiment of the invention, the input section furthermore comprises a light sensor, LTS, an accelerometer, ACC, and a position sub-system, PSS, such as GPS (Global Position System) receiver, providing for the geographical location of the terminal.

The mobile communication terminal is adapted to interact with various applications, such as an access application, a control application and an emergency application. These respective applications are adapted to enter a plurality of states, which shall be explained below.

The terminal furthermore comprises a schedule function, SCH, in which the user may assign activities, such as normal hours for sleep and work. The schedule may furthermore contain specific tasks and meetings as specified by the user. The data pertaining to the schedule function is stored in the memory, RAM, in the mobile communication terminal. The schedule is based on a rudimentary default schedule comprising basic routines. It may also be a more elaborate schedule comprising detailed information, for instance as modifications to the default schedule.

System

According to the invention, additional services rendered by at least one dedicated network server, coupled to a mobile base station system, co-operate with the above-described mobile communication terminal.

Such a system has been disclosed in FIG. 2 and shall now be described more in detail.

The mobile communication system according to the invention may be implemented in a GSM cellular mobile phone system, but other systems such as the D-AMPS cellular system or other suitable mobile phone or wireless datacom systems can be used.

Figure 2:
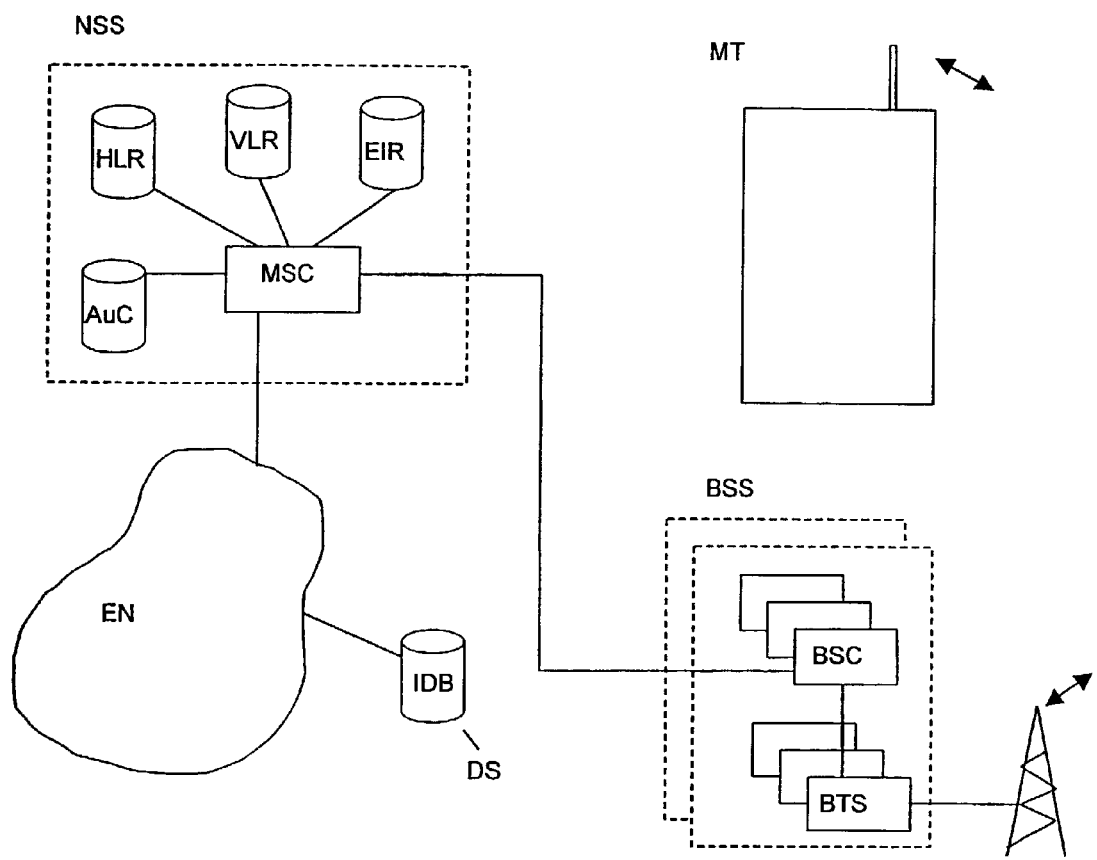
FIG. 2 shows a mobile communication system for use in connection with mobile terminals.

The preferred communication system shown in FIG. 2 comprises several functional entities which can be divided into five main parts: A plurality of mobile terminals, MT, of which only one is shown, a plurality of base station sub-systems, BSS, a network sub-system, NSS, and an external network, EN.

The base station sub-system, BSS, controls the radio link with the mobile terminal MT.

The network subsystem, NSS, the main part of which is the mobile services switching centre, MSC, performs the switching of calls or data between mobile users, MT, and other users in the network. The network subsystem, NSS, is arranged to switch to a Public Switched Telephone Network (PSTN), Integrated Services Digital Network (ISDN), Packet switched public Data Network (PSPDN), and Circuit Switched Public Data Network (CSPDN) etc. These networks have been illustrated in FIG. 2 by the external network, EN. The external network, EN, could also comprise networks coupled to the Internet.

The MSC also handles the mobility management operations. Other functional blocks handle the Operations and management centre (not shown) and supervise the proper operation and set-up of the network. The mobile terminal, MT, and the base station sub-system, BSS, communicate across an air interface or radio link.

The mobile unit is uniquely identified by the international Equipment Identity (IMEI). In the subscriber identity module, SIM, there are stored an International Mobile Subscriber Identity (IMSI) used to identify the subscriber to the system, a secret key for authentication, and other identification. The subscriber identity module, SIM, may be protected against unauthorised use by a password or personal identity number etc.

The base station sub-system, BSS, comprises a plurality of Base transceiver stations, BTS, and base station controllers, BSC. The base station transceiver station, BTS, accommodates radio transceivers that define a cell and handles the radio-link protocols with the mobile terminal, MT. The base station controller, BSC, manages the radio resources for one or more BTS's, handles radio-channel set-up, frequency hopping and other tasks well known to the person skilled in the art.

As mentioned above, the central element in of the Network subsystem, NSS, is the MSC, which acts as a normal switching node and additionally provides all the functionality needed to handle the mobile subscriber through processes such as registration, authentication, location updating, handovers, call routing to a roaming subscriber, and billing. A home location register, HLR, and a visitor location register VLR, together with the mobile switching centre, MSC, provide the call routing capabilities of the cellular network.

For authentication and security purposes an equipment Identity register, EIR, and an Authentication centre, AUC, are provided, as is known from conventional GSM systems. The authentication is based on matching secret keys found on the subscriber identity module, SIM, of individual mobiles, MT, and their corresponding copies in the authentication centre, AUC.

The visitor location register, VLR, contains selected administrative information about those individual mobile terminals, which are currently located in the geographical area controlled by the associated mobile switching centre, MSC.

A rough estimate of the momentary position of a mobile terminal can be gathered from the respective base station subsystem, BSS, or visitor location register, VLR, a particular mobile terminal, MT, is assigned to when coupled to the mobile network.

According to certain aspects of the invention, the external network, EN, is coupled to an information database, IDB, on a dedicated server, DS, on which data messages and exact position data of mobiles and locations can be stored, updated and deleted. The message data held on this database may be of a completely arbitrary nature and can relate to short text messages, pictures, audio files etc. According to the invention, such data is adapted to be linked to specific sets of locations or set of locations associated with individual mobile terminals.

The information database may be implemented on a single dedicated server accessible over the Internet, for instance.

The information database may also be arranged as a distributed database located on additional servers.

Exact positioning of the individual mobile terminals can be accomplished by a positioning means. According to a preferred embodiment of the invention, each mobile unit is provided with a positioning subsystem PSS, such as a GPS (Global Positioning System) unit or a differential GPS unit for enhanced precision. The PSS unit is adapted to export findings of the present location of the mobile terminal to other application programs running on the mobile terminal, MT. This positional information is adapted to be further transported to the information database, IDB, through the mobile data interface, MDI.

The positioning of the mobile terminals may alternatively be accomplished through other known methods, e.g. by means of locating signal strengths and/or delay variations in signals sent between base stations and mobile terminals. Optionally the positioning means may be incorporated in the base stations or MSC's. In the latter case the positioning means may be adapted to issue positional information to the information database.

It should be understood that the positional information on mobile terminals, MT, is updated at predetermined intervals such that the actual location of a mobile terminal can be resolved with a reasonable degree of precision.

According to a further aspect of the invention, the user of the mobile terminal may selectively disable the issuance of accurate positional information to or block the gathering of such information in the information database, IDB, thereby offering users, as an option, that their exact movements can not be registered.

Functionality

According to the invention, the mobile communication terminal, MT, is adapted to sense the status of a user wearing or being in the vicinity of the mobile communication terminal.

The terminal derives the status of the user from signals provided by the input section such as sounds surrounding the terminal, from information in the schedule, SCH, pertaining to the user and/or from signals relating to the position of the user. These signals and information are processed according to internal routines, whereby various modes of operation of the mobile communication terminal are resolved. Predetermined actions, as performed by applications in the mobile communication terminal, are controlled in accordance with the actual modes of the terminal.

Access Application

In FIGS. 3–7, various functional diagrams relating to the access application have been shown.

In the access application, calls directed to the mobile communication terminal are answered with predetermined messages. The answering functionality may reside in the hardware and software in the mobile terminal or it may reside in a mobile communication system, such as in a data base in the network serving the radio base stations, which shall be explained further in the following. Incoming calls may furthermore be re-directed to another predefined number according to the access state of the terminal as explained below.

In FIG. 3, the access modes of the terminal are shown. The various access modes have been denoted 1—"Sleep", 2—"Work meeting", 3—"Work active", 4—"Accept all", 5—"Home rest" and 6—"Off". As appears from the diagram, the operation of the various applications running on the mobile terminal depends on the access mode and the actual person calling the user as belonging to a number of predefined groups specified by the user.

The user groups comprise a VIP-group containing important persons, which the user needs to be in contact with on most occasions. This group may comprise family persons or perhaps close business contacts, kindergarten personnel and the like.

Further groups are friends and colleagues. An exclusion group is also an option. A rest group is formed by the persons not provided for in the other groups and persons which can not be identified by the terminal.

The answering application answers by a number of predetermined phrases or options, A–D, such as:

A: "I should appreciate not to be disturbed right now, if urgent please dial . . . or leave a message", B: "I am currently in a meeting; please dial the number for the following three options: if urgent please dial 1, if you want to leave a message; dial 2, if you want to be redirected to another telephone number, dial 3"

C: "I am not able to take the phone, please leave a message", and

D; Call redirection.

Further phrases/actions could be added to the list in accordance with the users personal preferences and needs.

In FIG. 3, a ring mode has been indicated. It should be understood from the diagram that the user's terminal rings only initially when this has been indicated in the diagram.

On other occasions, the invention sets forth a feature, by which a predetermined phrase, such as A above is first issued to the calling party without the called party's terminal initially ringing, informing the calling party to signal back to the called party by for instance DTMF (Dual Tone Multi Frequency) signalling, that a ring signal can be issued by choice of the calling party and upon reception of such a signal issuing such a signal. This option is provided for in connection with phrases A and B. Phrase/option C is meant for those occasions where the user is not accessible. The feature provided in option A and B, whereby the calling party can dial a predetermined number on his own telephone is accomplished by normal DTMF signalling. In option D, the call is simply redirected to one of a plurality of predetermined numbers in accordance with the calling person's identity.

It should be understood that the diagram provided for in FIG. 3 is optional. Advantageously FIG. 3 defines a default setting that can be modified by the user, through suitable programming. According to the invention, very simple programming instructions, as those denoted by option A–D and Ring are used for creating the desired functionality.

In FIG. 4, an exemplary default schedule, SCH, has been shown, indicating some expected daily phases, a) awake and active at home or away from home, b) working and being active, and d) resting or sleeping. According to a more specific schedule (not shown) meetings, c) have been entered by the user.

It is off course desirable that the schedule function, SCH, comprises all the scheduling needed for one person and it should therefore include further options, which are not shown in the default schedule in FIG. 3 and which however will not necessarily interact with the functionality of the present invention.

It should be understood that the schedule could be provided by an available product, providing appropriate data export/import functionality with other systems, such as a personal computer.

According to the invention, the terminal comprises one or more sensors, which assist in determining the actual needs or habits of the user. The light sensor, LTS, incorporated in the terminal measures the light in the surroundings. The microphone, MIC, measures the general sound level.

These inputs are weighted according to an internal routine in the central processor whereby an output signal z indicates that it is calm and dark around the terminal, while the signal x indicates the opposite, namely that the user is active.

Provided that the terminal is placed on or near the person, it can be established whether the user is sleeping. It is envisaged that the terminal is rendered extremely wearable by the advantageous embodiment of the terminal shown in FIG. 1, in which the terminal is separated into two units: One part is meant to be carried on the user and another part is meant to be stationed in the local vicinity of the user, such as in the users bag or house or office or the like. Both units may off course also be held by the user.

According to the preferred embodiment of the invention other sensors such as a position unit or an accelerometer gives further evidence about the users daily routines and wishes.

The positional sub-system PSS advantageously comprises a GPS unit included in the terminal. The positional information needed for determining whether the user is at work or at home or somewhere else could also be derived from the base station he is normally coupled to when being at the two first positions. The positional sensor may provide a limited number of outputs such as being at work (Work), being at home (Home), or neither being at home or at work (Out).

The operative access modes of the terminal specified in FIG. 3 are automatically selected by the terminal in accordance with the sensor outputs and the schedule defined in FIG. 4. This selection is performed by the exemplary scheme shown in FIG. 5. A program running in the central processor CP carries out this task. It should be understood that such a program can be modified by the user by using simple programming instructions, more or less corresponding to the scheme shown in FIG. 5.

According to the preferred embodiment of the invention, the above automatic selection of various modes provided for in FIG. 5 may be shut off by manually selecting the "Off" mode 6 by means of the data entry means, DEM.

The actual choice of the above automatic functions found in the access mode is preferably indicated to the user on the display means. It should be understood that the user could override the automatic selections by appropriate action. This overriding action would be predominant for a certain amount of time before the automatic resolving applies again.

Public State Application

According to the further embodiment of the invention, the mobile communication system is adapted to store information relating to the state of the user in a dedicated database, which information in the following shall be denoted as a persons public state.

By way of example, the public state could advantageously be assigned values such as—"ready for calls"—30, "not ready for calls"—31—and could be based on the mode in FIG. 5, whereby "ready for calls" 30 corresponds to modes 3, 4 and 5 and "not ready for calls" 31 corresponds to modes 1, 2 and 6. The assignment of values according to the various access modes has been shown in FIG. 6.

This public state for individual users are stored in a network server in a database, for instance in the information database, ID, and this information can be required by other mobile stations. Advantageously, the information for a predetermined number of contact persons using the above service is exported to the inquiring user.

For confidentiality/integrity reasons, the information can be rendered available only to users, who are specified as belonging to the private contact list of the particular user, whose state is being required. In this manner, persons not being specified on a particular user's private contact list can not be informed about the particular user's state or whereabouts.

According to a further embodiment, the public state may also correspond closely to the access modes 1–6 specified in FIG. 5.

As mentioned above, additional detailed information relating to the person may be gathered in the information database, ID, such as the exact location of the individual or special public messages or data assigned to a person. The public states are updated at regular intervals.

Control Application

According to the preferred embodiment of the invention, the state of the user as resolved by the input section of the terminal also influences other applications running on the terminal and their modes.

A control application has been provided, which comprises various dedicated control modes. When the terminal is activated, for instance when the terminal is turned on or is getting access to the mobile telephone system, the terminal automatically enters a particular pre-selected control mode in the manner, which shall be explained below.

The control application comprises an Internet browser, preferably a WAP and/or Internet browser, and/or remote control panels.

In the various control modes the browser is adapted to point at predetermined home pages on the Internet as start-up pages and/or being accompanied with special predetermined selections of links, commonly referred to as bookmarks or favourites as a start page. The control mode is automatically selected such as to reflect the users state or needs.

In a first embodiment of the control application, three dedicated control modes have been defined. The control mode depends on the data provided by the positional sub-system of the terminal: If Home 20 is determined, the control mode enters the home control mode 10, if Work 21 is determined, the Work control mode 11 is selected and if Out 22 is determined the Travel control mode 12 is automatically selected. This has been illustrated by the table in FIG. 7.

The respective control modes 10, 11 and 12 select automatically the home page of a predetermined person, e.g. the user and presents a first selection of links relating to the users home, work or travel situation. The work control mode 11 selects automatically the work Intranet home page as a start up page presenting a second selection of links relating to the user's work place. The travel control mode 12 may also contain a home page set up by the user or by local travel information service, presenting a third selection of links relating to the user's typical travel routines.

Instead of referring automatically to an Internet page referring to the home in the home control mode 10, the terminal could alternatively provide a set of remote control commands 13. The remote control command is adapted for controlling electronic apparatuses in the home, such as TV, radio, house alarm, house lighting etc, whereby these apparatuses are provided with a local range interface, LRI, similar to the ones provided for wirelessly communicating between the first and the second unit. As mentioned above, for instance the Ericsson™ Bluetooth™ interface is suitable for this purpose. The remote control mode could also interact with a home LAN (local area network), through which connectivity with other home devices can be made. It is envisaged that local telephone calls can be made over the local range interface, LRI, of the terminal, provided a suitable modem also having a local range interface, LRI, is provided.

According to a further aspect of the invention, the mobile terminal is adapted to export its positional information as provided by the positional sub-system, PSS, to specific Internet services, whereby search criteria or information presentation can be made dependent on the actual location of the user so as to suit the users actual need for local information.

Optionally, the position of the user, as belonging to the categories home and work, could also be established from the schedule settings. This option has been shown in the diagram on FIG. 8. It is noted that the travel option can not be detected automatically in this option.

According to a second embodiment of the control application, the control mode is chosen according to which control mode was last used at a particular location by the user, whereby the location is determined by the position sub-system, PSS.

For this purpose, the terminals keep track of last used control modes, including recent browser settings such as links, and associate this information with the particular physical location on which the user was when he entered a specific control mode.

According to a third embodiment of the control application, the control mode is chosen according to the control mode, which was last used in a particular combination of location and access mode, as determined by for instance access modes 1–6 defined in connection with the access application. That is, if many control modes have been made on a particular location a further selection criterion is made as to which control mode was last used in a particular access mode.

By means of example, say the user is in a work meeting at his workplace and requires via the internet a certain intranet home page relating to a video conference, the information relating to the specific intranet home page is stored in terminal and associated with the access mode 2, defined above.

Subsequently, the user may apply many other functions and thereby use respective control modes on his terminal and enter many other access modes at various locations, but when returning to access mode 2 at the very same place, he is prompted with the same control mode as he used last time he was in the access mode at the particular location.

Likewise, when using the terminal at a bus stop for searching the timetable, the terminal initially uses a control mode set-up, which corresponds to the last used mode at the particular location. Moreover, when the user visits his favourite supermarket, the terminal shows automatically a specialised homepage relating to, for instance, the offers of the day, the contents of the user's refrigerator and the users account.

The above automatic functions found in the access mode and in the control mode are preferably indicated to the user on the display means as a start up-option or idle state option. It should be understood that the user can override the automatic selections by appropriate action at any time. This overriding action would be predominant for a certain amount of time before the automatic resolving applies again.

Emergency Application

Still another application, denoted an emergency application, uses the input data as provided by the sensors.

If, for instance, excessive accelerometer values are encountered, a warning is issued to a predetermined receiver, by means of recorded voice message or e-mail message delivered by the terminal. This service can provide safety to especially handicapped or elderly persons by informing certain helpdesks about a person's need for acute help. Conveniently, a telephone call to an operator from the above helpdesk is automatically initiated, when the above warning has been issued. Thereby, the operator can inquire about the user's state.

In line with the above comments on voice recognition, the terminal could also provide the above response if a call for help is made.

FURTHER EMBODIMENTS OF THE TERMINAL ACCORDING TO THE INVENTION

Figure 9:
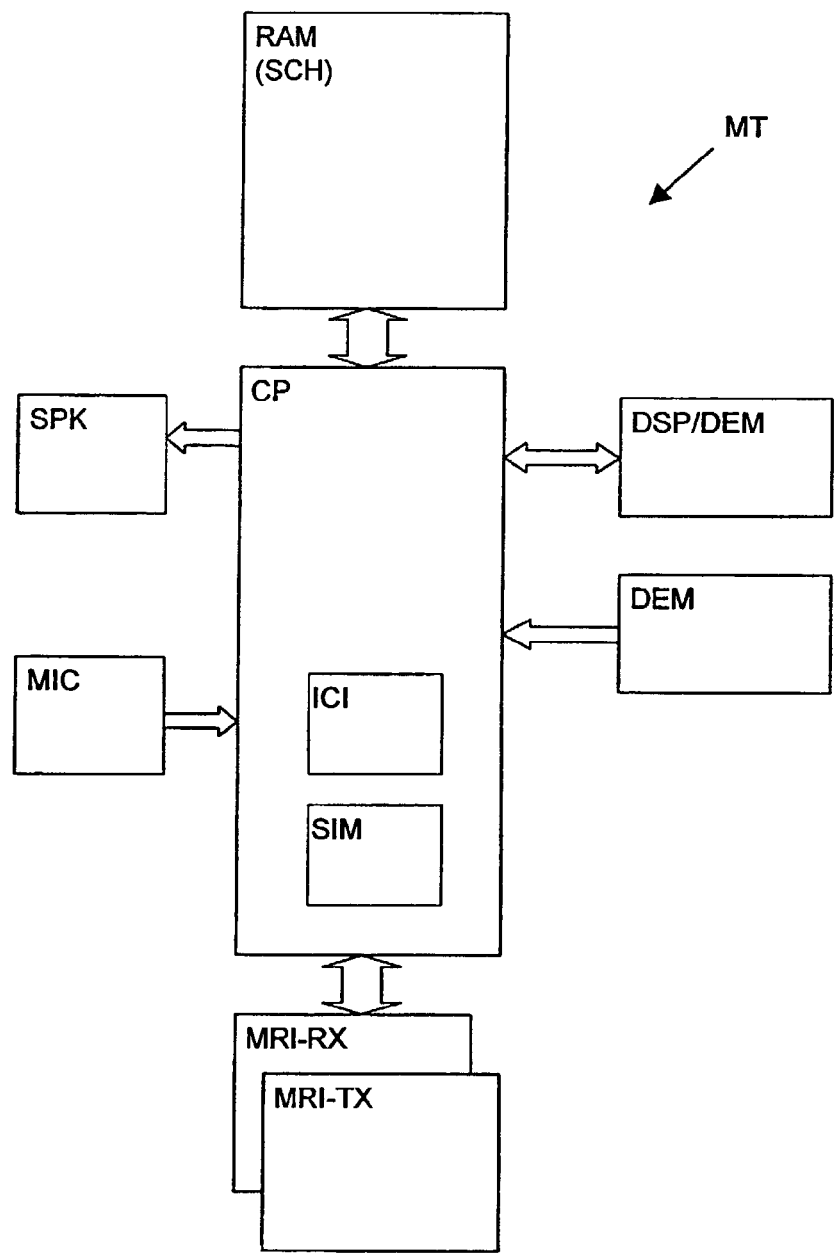
FIG. 9 shows a second embodiment of a mobile terminal according to the invention.

In FIG. 9, a second embodiment of the terminal according to the invention has been shown. This embodiment comprises one sole unit and is therefore not provided with a wireless interface. Furthermore, the input section only comprises a microphone.

Therefore, states z and x are only dependent on the sound level and instead of having a positional sensor the user selects manually the options Home 20, Out 21 and Work 22 in FIGS. 5 and 6, by manually entering these states over the data entry means.

Thereby, a particular economical embodiment has been accomplished.

REFERENCE SIGNS

MT mobile terminal
CP central processor
ICI internal conversion interface
CI conversion interface
SIM subscriber identity module
MRI mobile radio interface
MRI-RX mobile radio interface—receive section
MRI-TX mobile radio interface—transmit section
RAM random access memory
SCH schedule
DSP/DEM display means/data entry means
DEM display entry means
VRC voice recognition means
PSS positioning sub-system
LTS light sensor
MIC microphone
SPK audio output means
ACC accelerometer
WI wireless interface
LRI local range interface
LRI2 additional local range interface
MS mobile communication system
BSS base station sub-system
BSC base station controller
BTS base station transceiver
NSS network sub-system
MSC mobile switching centre
VLR visitor location register
HLR home location register
EIR equipment identity register
AUC authentication centre
EN external network
DS dedicated server
IDB information database
z calm state
x lively state
a active
b work active
c work meeting
d rest
1 sleep
2 work meeting
3 work active
4 accept all
5 home rest
6 off
10 first browser mode
11 second browser mode
12 third browser mode
13 remote control mode
20 home location
21 work location
22 out location
30 ready for calls
31 not ready for calls

The invention claimed is:

1. A mobile terminal comprising:
   a position sub-system for determining the position of the terminal; and
   a control application controlling the terminal to pre-select one of a plurality of predetermined control modes wherein at least some of which correspond to respective start-up browser settings, each browser setting pointing at a predetermined Internet or Intranet page, said control application further arranged to
   determine the previous control mode selected by the mobile terminal for said determined position; and
   reselect the same control mode for said determined position wherein said same control mode includes a start-up browser setting previously used by said mobile terminal at said determined location.

2. The mobile terminal according to claim 1, wherein at least one control mode is a remote control mode for controlling electronic appliances.

3. The mobile terminal according to claim 1, the terminal furthermore comprising an input section comprising at least one input sensor, wherein the mobile terminal is adapted to sense the status of a user in the vicinity of the mobile terminal, the status of the user being derived from input signals, including sounds surrounding the mobile communication terminal;

wherein the terminal judges the users state according to at least one of light, sound and movement levels, wherein if the at least one of light, sound and movement level falls beneath predetermined thresholds within a predetermined time period, the user is deemed to be in a calm state and if this is not the case, the user is deemed to be in a lively state;

wherein the terminal determines a predetermined access mode in dependency on at least one of the input signals and/or schedule settings;

wherein the control application controls the active control of the terminal to pre-select one of a plurality of predetermined control modes comprising at least one of browser settings and remote control settings as start-up option, wherein the pre-selected control mode is dependent on the last selected control mode on a particular location, as determined by the position sub-system, and in a particular access mode of the terminal.

4. The mobile terminal according to claim 3, comprising an answering application, according to which calls directed to the mobile terminal are answered with predetermined messages or redirected according to the predetermined access mode.

5. The mobile terminal according to claim 4, whereby
    the terminal is able to detect who is calling in accordance with a number representation service, wherein a plurality of predetermined messages and/or actions can be assigned to respective predetermined groups, including private contacts, work contacts and a group consisting of neither private nor work contacts; and wherein the answering application is being controlled in dependency on the identity of the calling party, as belonging to one of the predetermined groups.

6. The mobile terminal according to claim 4, wherein the answering application comprises a ring state, in which the terminal gives or is prevented from giving a ring signal; and wherein the terminal allows the calling party, after having received the predetermined message from the answering application to overrule the state in which the terminal is prevented from giving the ring signal and cause the terminal to ring within the same call.

7. The mobile terminal according to claim 3, further comprising a sound sensor for measuring the sound level around the terminal.

8. The mobile terminal according to claim 3, comprising a light sensor measuring the light level around the terminal.

9. The mobile terminal according to claim 3, comprising an accelerometer for measuring the level of movements the terminal is exposed to.

10. The mobile terminal according to claim 1, wherein the terminal is adapted to convey public state information, corresponding or relating to the user and being derived from the access modes of the terminal to an external database, being accessible from other terminals over the Internet.

11. The mobile terminal according to claim 1, comprising a separate first unit and a separate second unit communicating wirelessly with one another over local range interfaces, the first unit comprising at least one input sensor and being adapted to be worn by the user.

12. The mobile terminal according to claim 1, wherein the pre-selected mode can be overridden by the user.

* * * * *